Patented Nov. 13, 1923.

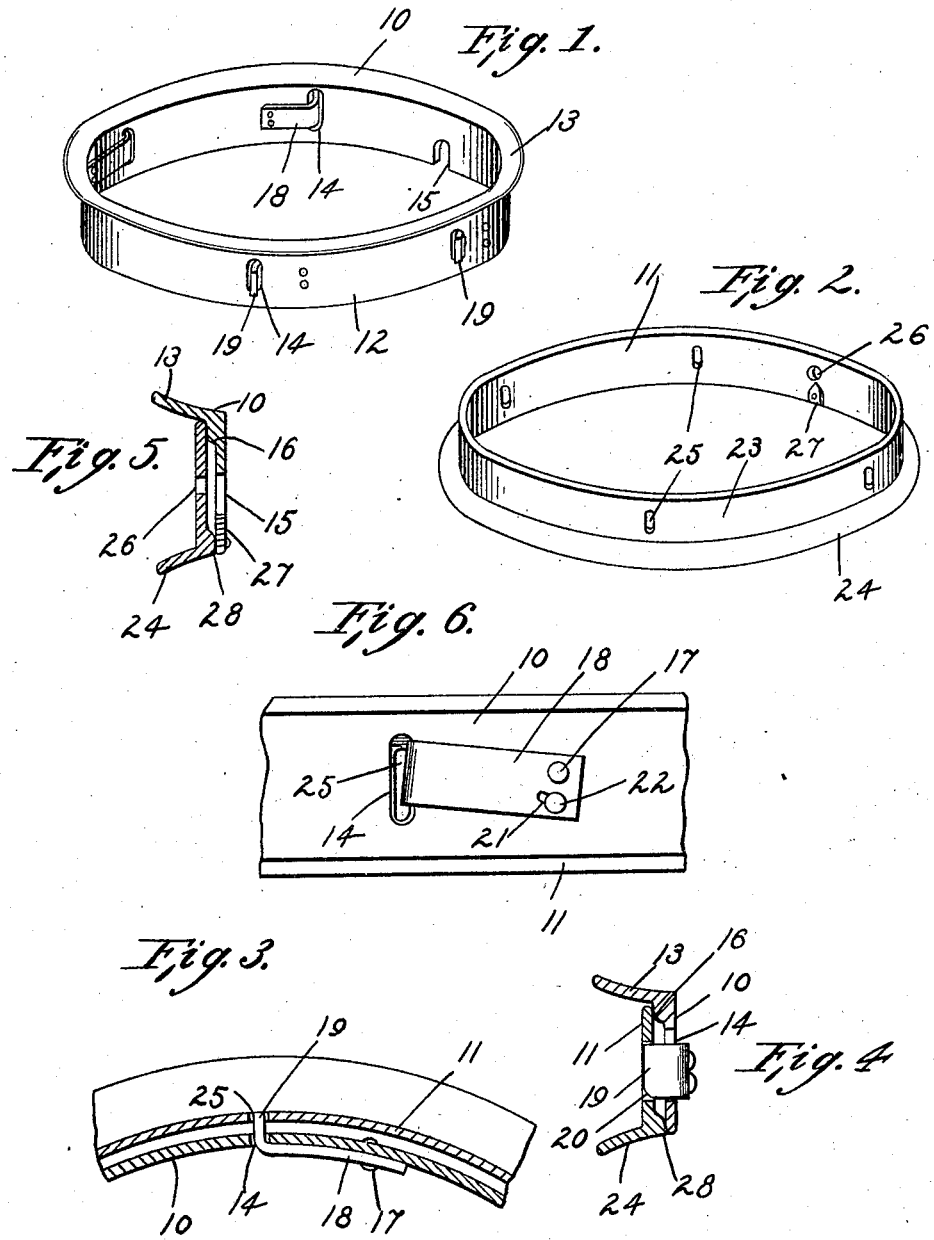

1,474,244

UNITED STATES PATENT OFFICE.

JOSEPH M. DIRIENZO, OF MADISON, WISCONSIN.

SEPARABLE RIM.

Application filed July 25, 1922, Serial No. 577,389. Renewed September 13, 1923.

*To all whom it may concern:*

Be it known that I, JOSEPH M. DIRIENZO, a citizen of the United States, residing at Madison, in the county of Dane and State of Wisconsin, have invented new and useful Improvements in Separable Rims, of which the following is a specification.

This invention relates to rims for pneumatic tires and has for its object the provision of a rim which is formed of separable sections and which will therefore greatly facilitate tire changing without it being necessary to expand and collapse the rim as is customary with the rims of the transverse split type.

An important object is the provision of a rim of this character which is provided with novel locking means which will automatically operate to lock the two sections together when they are forced into their proper or tire retaining position.

Another object is the provision of a rim in which the engaging surfaces are made as small as feasible to reduce likelihood of rusting or sticking of the sections.

An additional object is the provision of a rim of this character which will be simple and inexpensive in manufacture, efficient and durable in service and a general improvement in the art.

With the above and other objects and advantages in view the invention consists in the details of construction to be hereinafter more fully described and claimed and illustrated in the accompanying drawings in which:

Figure 1 is a fragmentary perspective view of one section,

Figure 2 is a fragmentary perspective view of the other section,

Figure 3 is a detail longitudinal sectional view showing the rim locked,

Figure 4 is a cross sectional view showing the two sections assembled,

Figure 5 is a cross sectional view taken through the place where the tire valve is received, Figure 6 is a detail view of the inside of the assembled rim showing one of the locking springs in released position.

Referring more particularly to the drawings I have shown my rim as comprising two sections 10 and 11 which are similar in construction. The section 10 comprises a cylindrical band 12 formed at one edge with a tire retaining flange 13 and provided upon its inner periphery with a plurality of slots 14 and a notch 15 for the reception of the valve stem of the tire. This band is thickened at its outer periphery at its flanged edge as shown at 16.

Loosely riveted or otherwise pivoted upon the inner periphery of the band 12, as shown at 17, are locking members 18 formed as leaf springs having angular ends 19 which project through the slots 14 and which extend beyond the periphery of the band 12. The projecting ends 19 are preferably inclined somewhat as illustrated at 20. Each spring is formed with a hole 21 which loosely engages upon a pin 22 projecting from the band.

The section 11 comprises a band 23 designed to be engaged exteriorly upon the band 12 and formed with a tire retaining flange 24. The band 23 is formed with slots 25 for the passage of the ends 19 of the locking members and is also formed with a hole 26 for the passage of the valve stem. Secured upon the inner periphery of the band 23 is a lug 27 adapted to enter the notch 15 when the sections 10 and 11 are engaged. The section 11 has its inner periphery near its flange thickened as shown at 28.

In the use of the rim the tire is placed upon the section 11 and the two sections 10 and 11 are pushed together, the section 10 telescoping within the section 11. The sections are arranged in such position relatively to each other that the lug 27 will be in position at the entrance of the notch 15 so that the slots 25 will be in line with the slots 14. When the sections are pushed together the outer ends 19 of the locking members when engaging the band 23 will be forced inwardly until the two sections 10 and 11 come entirely together, whereupon the locking members will spring outwardly with the ends 19 thereof snapping into the slots 25. The valve stem is accommodated within the hole 26 and notch 15, the outer end of the notch being closed by the lug 27. The thickened portions 16 and 28 will define a recess between the sections and reduce the area of contact to prevent sticking. In removing a tire some suitable tool must be inserted beneath the locking members 18 for withdrawing the ends 19 thereof from the slots 25 to permit the two sections 10 and 11 to be pulled apart. When the springs are thus released, they may be swung slightly upon their pivots so that their ends 19 may engage at the edges of the slots, the pins 22 and holes 21 permitting this action.

From the foregoing description and a study of the drawings it will be apparent that I have thus provided a simply constructed and consequently inexpensive rim which is quickly and easily capable of separation whenever tire changing is necessary and which is not likely to rust or stick owing to the smallness of the engaging surfaces. Owing to the simplicity of the construction and the fewness of parts it is apparent that there is nothing to get out of order and that the device should have a long life and satisfactorily perform all the functions for which it is intended.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A rim formed of a pair of similar sections each including a cylindrical band formed at one edge with a tire retaining flange, both of said bands being formed with slots to be brought into registration, and a plurality of locking elements formed as leaf springs pivoted upon the inner periphery of the band of one section and having outwardly extending ends designed to pass through the slots in the band of the other section.

2. A rim formed of a pair of similar sections each including a cylindrical band formed at one edge with a tire retaining flange, both of said bands being formed with slots to be brought into registration, a plurality of locking elements formed as leaf springs pivoted upon the inner periphery of the band of one section and having outwardly extending ends designed to pass through the slots in the band of the other section, pins for limiting swinging movement of the locking members, one section being formed with a hole for the passage of the valve stem of a tire and the other section being formed with a notch designed to register with said hole, and a lug secured adjacent said hole and closing the outer end of the notch.

3. A rim formed of a pair of similar sections each including a cylindrical band formed at one edge with a tire retaining flange, both of said bands being formed with slots to be brought into registration, a plurality of locking springs pivoted upon the inner periphery of the band of one section and having outwardly extending ends designed to pass through the slots in the band of the other section, and means for limiting swinging movement of the locking members.

4. A rim formed of a pair of similar sections each including a cylindrical band formed at one edge with a tire retaining flange, both of said bands being formed with slots to be brought into registration, a plurality of locking springs pivoted upon the inner periphery of the band of one section and having outwardly extending ends designed to pass through the slots in the band of the other section, and means for limiting swinging movement of the locking members, consisting of pins passing through slots in the locking members and passing through the band which carries the springs.

In testimony whereof I affix my signature.

JOSEPH M. DIRIENZO.